United States Patent
Mickelat et al.

(10) Patent No.: US 10,279,285 B2
(45) Date of Patent: May 7, 2019

(54) PROFILED STRAINER BAR AND STRAINER MADE OF PROFILED STRAINER BARS

(71) Applicant: Andritz Fiedler GmbH, Regensburg (DE)

(72) Inventors: Thomas Mickelat, Nittenau (DE); Michael Reinstein, Teublitz (DE)

(73) Assignee: ANDRITZ FIEDLER GMBH, Regensburg (DE)

( * ) Notice: Subject to any disclaimer, the term of this patent is extended or adjusted under 35 U.S.C. 154(b) by 571 days.

(21) Appl. No.: 14/904,629

(22) PCT Filed: Aug. 14, 2014

(86) PCT No.: PCT/EP2014/002258
§ 371 (c)(1),
(2) Date: Jan. 12, 2016

(87) PCT Pub. No.: WO2015/024648
PCT Pub. Date: Feb. 26, 2015

(65) Prior Publication Data
US 2016/0144299 A1 May 26, 2016

(30) Foreign Application Priority Data

Aug. 20, 2013 (DE) .................. 10 2013 013 907
Aug. 5, 2014 (DE) .................. 10 2014 011 679

(51) Int. Cl.
| B07B 1/12 | (2006.01) |
| B07B 1/18 | (2006.01) |
| B07B 1/46 | (2006.01) |
| B01D 29/13 | (2006.01) |

(52) U.S. Cl.
CPC ............ *B01D 29/13* (2013.01); *B07B 1/12* (2013.01); *B07B 1/18* (2013.01); *B07B 1/4654* (2013.01); *B07B 1/4618* (2013.01)

(58) Field of Classification Search
CPC .. B01D 29/13; B07B 1/12; B07B 1/18; B07B 1/4618; B07B 1/4654
See application file for complete search history.

(56) References Cited

U.S. PATENT DOCUMENTS

| 5,011,065 A | 4/1991 | Musselmann |
| 6,047,834 A | 4/2000 | Dölle et al. |
| 6,579,458 B2 | 6/2003 | Mickelat et al. |
| 8,292,086 B2 | 10/2012 | Mickelat et al. |
| 2010/0072113 A1* | 3/2010 | Mickelat .............. B01D 29/445 209/395 |

FOREIGN PATENT DOCUMENTS

| DE | 44 32 842 | 3/1996 |
| DE | 196 09 316 | 9/1997 |
| DE | 102006028474 | 12/2007 |
| EP | 0 316 570 | 5/1989 |
| EP | 0 499 154 | 8/1995 |
| EP | 0 774 022 | 9/1999 |
| EP | 0 808 941 | 12/2001 |
| EP | 1 205 227 | 5/2002 |
| FR | 1499000 | 3/1966 |
| WO | WO 2008/119548 | 10/2008 |
| WO | WO 2011/157529 | 12/2011 |

OTHER PUBLICATIONS

International Search Report issued by the European Patent Office in International Application PCT/EP2014/002258 dated Oct. 6, 2014.

* cited by examiner

*Primary Examiner* — James C Goloboy
(74) *Attorney, Agent, or Firm* — Henry M. Feiereisen, LLC

(57) ABSTRACT

A profiled strainer bar has a base region and a head region. A straining slot or a straining gap is produced between flanks of the straining slot at the head region. Each flank at the head region has a radius with a common center on the upstream and downstream side. A strainer, preferably in the shape of a strainer basket, has straining slots or straining gaps formed between profiled strainer bars. The strainer bars have a geometry at the strainer bar base region with the geometry being adapted to receiving recesses of support elements and being received in the receiving recesses. The strainer bars are permanently secured to the receiving recesses. The strainer bars are profiled such that each flank on the head region of the strainer bar has a radius with a common center on the upstream and downstream side.

15 Claims, 6 Drawing Sheets

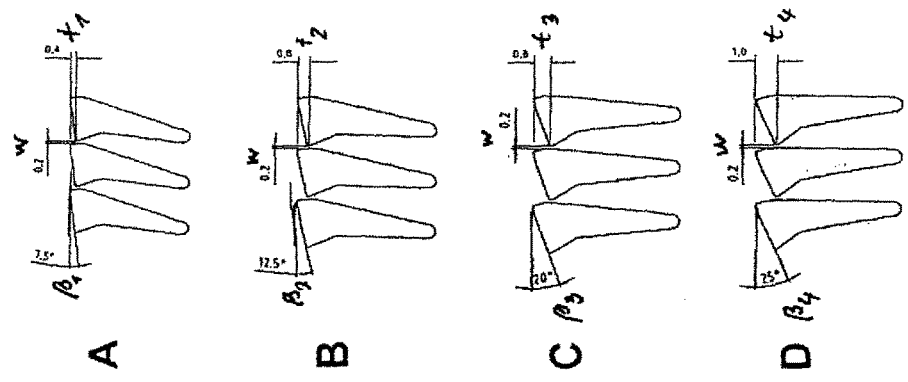
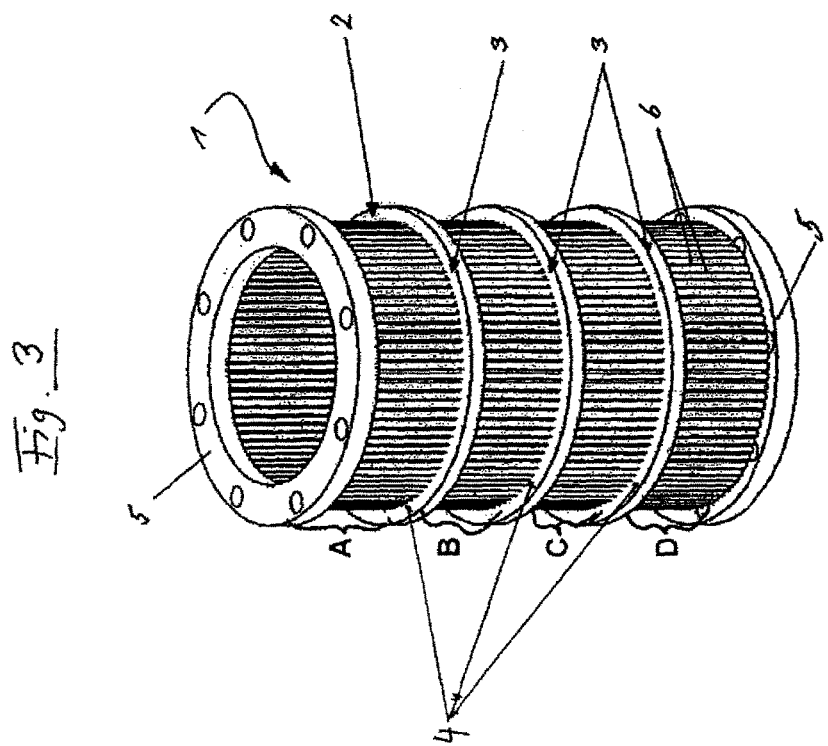
Fig. 3

PROFILED STRAINER BAR AND STRAINER MADE OF PROFILED STRAINER BARS

CROSS-REFERENCES TO RELATED APPLICATIONS

This application is the U.S. National Stage of International Application No. PCT/EP2014/002258, filed Aug. 14, 2014, which designated the United States and has been published as International Publication No. WO 20151024648 and which claims the priority of German Patent Applications, Serial No. 10 2013 013 907.4, filed Aug. 20, 2013 and Serial No. 10 2014 011 679.4, filed Aug. 5, 2014, pursuant to 35 U.S.C. 119(a)-(d).

BACKGROUND OF THE INVENTION

Profiled strainer bars and strainers made from such profiled strainer bars which are also commonly referred to as "bar strainer structure", are known for example from WO 2008/119548 A2, EP 0 316 570, EP 0 499 154 B1, EP 0 808 941 B1, EP 1 205 227 A1, DE 44 32 842 A1, DE 196 09 316 C2 and EP 0 774 022 B1.

In the strainer according to WO 2011/157529 A1, the strainer bars have respective curvatures upstream and downstream at their slot-forming flanks. These curvatures have radii whose centers are far apart. In any event, they have no common center point.

Profiled strainer bars and strainers made therefrom have an essentially a constant slot width and profile depth across the entire height or longitudinal axis of the strainer or in the Z direction. In the throughput direction or in the Z direction of the strainer, however, there are different requirements for the conditions for implementing the straining and sorting treatment. Thus, for example, the thickening conditions or fiber thickening conditions change, as well as the capacities in the throughput direction of such strainer.

It is thus an object of the invention to provide a profiled strainer bar and a strainer made of such profiled strainer bars, which improve the sorting efficiency, have a low tendency for clogging and produce and achieve higher throughput rates.

SUMMARY OF THE INVENTION

According to the invention, on the one hand a profiled strainer bar with a base and a head region is provided for this purpose, wherein the head region has slot flanks slot a straining slot or a straining gap. According to the invention, such a profiled strainer bar is characterized in that the slot-forming flanks at the head region of the strainer rod have upstream and downstream each a radius with a common center. Optionally, the upstream and downstream slot-forming flanks at the head region of the adjacent strainer bars have also each a radius with a common center. Since the radii of curvature of the slot-forming flanks at the head region of the strainer bar have upstream and downstream a common center point, the slot width can remain constant and unchanged in both cases in spite of a change in the profile depth or in the orientation of the slot flanks creating the straining slot or the straining gap at different angles in relation to a tangent of the sleeve of the strainer. Thus, strainers can be provided with the strainer bars according to the invention in which, although the slot width remains substantially constant when viewed in the vertical direction or the axial direction, different profile depths can be adjusted to match the respective desired operating conditions for the strainer treatment. This makes it possible to improve in particular the sorting efficiency or strainer efficiency. Furthermore, the tendency for clogging can also be reduced, and higher throughput volumes can be attained.

According to a preferred embodiment of the profiled strainer bar, the radii of the slot-forming flanks can have different sizes.

According to another preferred embodiment of the profiled strainer bar, the radius of the upstream slot-forming flank can be larger than the radius of the downstream slot-forming flank.

Preferably, the profiled strainer bar is designed so that the radius at the downstream slot-forming flank is 0.1 mm to 1, 9 mm, preferably 0.2 mm to 0.5 mm.

The profiled strainer bar is preferably designed such that the radius at the upstream slot-forming flank is 2.0 mm to 6 mm, preferably 2.1 mm to 4.0 mm.

Furthermore, according to the invention, a profiled strainer bar is provided, wherein the radii (R1, R2) at the upstream and downstream slot-forming flanks (8, 9) are connected by a straight-line tangent.

Furthermore, according to the invention, a strainer is provided which is preferably designed in the form of a strainer basket. This strainer has straining slots or straining gaps formed between profiled strainer bars and the strainer bars are at their base region received in receiving recesses of supporting elements matching the base region geometry and permanently attached thereto. According to the invention, a strainer is characterized in that the strainer bars are formed at their head region in accordance with the aforedescribed profiles.

The strainer bars can thus be arranged in the strainer on the strainer sleeve surface with different profile depths and/or at different angles with respect to a tangent, but with essentially constant slot width, so that the strainer can perform the straining tasks and straining treatments in the throughput direction of the strainer under different operating conditions. In this way, higher throughput volumes can be realized, and more particularly, an improved strainer efficiency is attained.

Preferably, the strainer is designed such that the rods are disposed along the strainer basket height from the inlet side to the outlet side of the strainer basket in regions divided with different angles ($\beta$) or profile depths. In this way, the strainer is divided into segments or regions in the axial direction, having different profile depths but always a substantially constant slot width. In such a design, a predetermined designed support element, preferably a predetermined designed support ring, may be assigned to each segment or each section. In general, the profile angle and the profile depth can change continuously from one support element to the next support element. Regardless of the selected embodiment, with the special profile of the slot flanks creating the straining slot or the straining gap, the straining slot width always remains constant independent of the profile depth or the profile angle.

According to the preferred embodiment of strainers, the strainer bars may be axially aligned with the strainer basket axis, or may alternatively be linearly inclined to the screen axis, or according to another preferred embodiment, the strainer bars may be discontinuously curved relative to the strainer basket axis. The orientation of the strainer bars is selected in accordance with and commensurate with the strainer tasks and strainer treatments.

Preferably, a strainer is characterized in that the strainer bars are arranged across the strainer basket height from the inlet side to the outlet side with a constant slot width between the respective straining slot or slot flanks slot the straining gap at different angles with respect to a tangent to the strainer basket sleeve surface for slot different profile depths. Preferably, the design is selected such that this angle relative to a tangent to the strainer basket sleeve surface increases from the inlet side to the outlet side of the strainer basket. At least in the preferred embodiment of the inventive strainer, the strainer bars are inclined relative to the tangent to the strainer basket sleeve surface at different magnitudes from the inlet side to the outlet side so that can different profile depths be realized in this way without changes in the slot width.

According to the invention, the strainer bar is designed at the slot flanks creating the straining slot or the straining gap so that these slot-forming flanks each have upstream and downstream a radius with a common center at the head region of the strainer bar. As a result, strainers can be provided, namely so-called "rod strainers" whose strainer bars have at the head region different angles in relation to a tangent to the screen sleeve surface, thus creating different profile depths, while keeping the slot width substantially unchanged. Since the slot-forming flanks at the head region each have a radius with an associated common center, only the profile depth changes depending on the angle of inclination, but not the slot width.

BRIEF DESCRIPTION OF THE DRAWING

The invention will now be explained in more detail with reference to preferred embodiments and with reference to the attached drawing, without inferring any limitations. The drawing shows in:

FIG. 3 a schematic perspective view of a preferred embodiment of a strainer in the form of a strainer basket having regions of different profile depths when viewed in the longitudinal axial direction of the strainer basket;

Identical or similar parts in the figures of the drawing are given the same reference numerals.

DETAILED DESCRIPTION OF PREFERRED EMBODIMENTS

Figure 1:
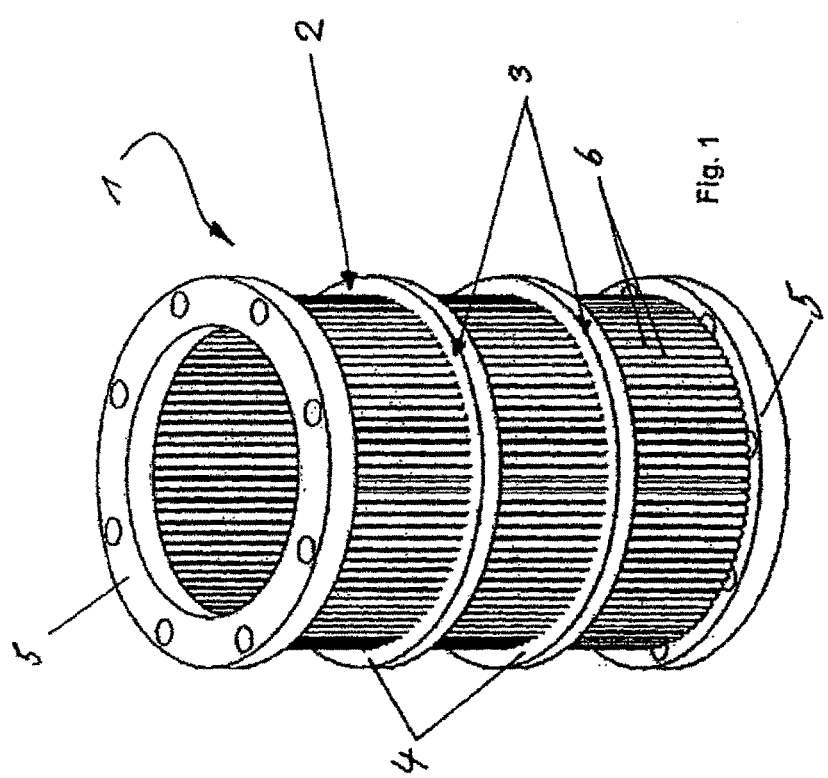
FIG. 1 a schematic overall perspective view of a strainer in the form of a strainer basket with an angle profile and a profile depth that change continuously with respect to the longitudinal axis of the strainer basket, and with a highlighted twisted strainer bar.

FIG. 1 shows a cylindrical strainer basket 2 as a preferred embodiment of a strainer designated overall with 1. It will be understood that the strainer 1 according to the invention may also be embodied in the form of a strainer plate. The strainer 1 includes support elements 3 which are in the illustrated example formed as support rings 4. So-called end flanges 5 are provided at the axial end of the strainer 1. As shown in FIG. 2a, foot sections 11 of strainer bars 6 are inserted in corresponding receiving recesses 10 of the support element 3, wherein a respective straining slot or straining gap is formed between the head regions 7.

Figure 2:
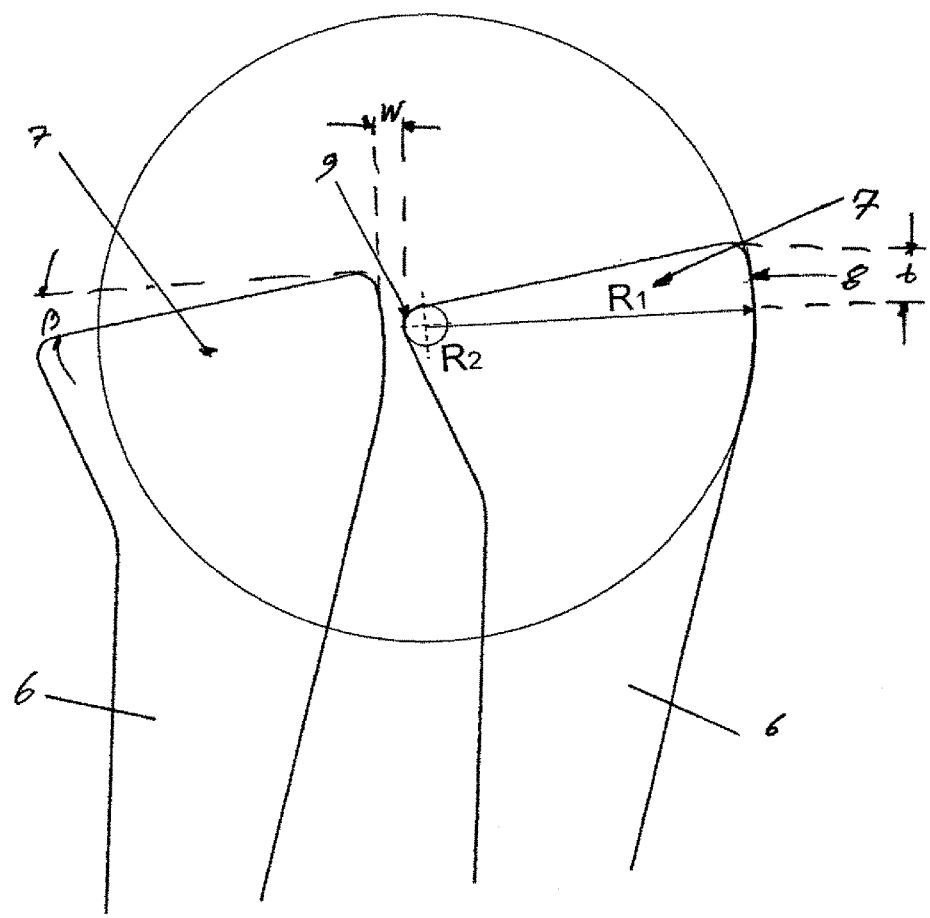
FIG. 2 a schematic detailed view of head regions of two consecutive strainer bars in an enlarged view.
Figure 2A:
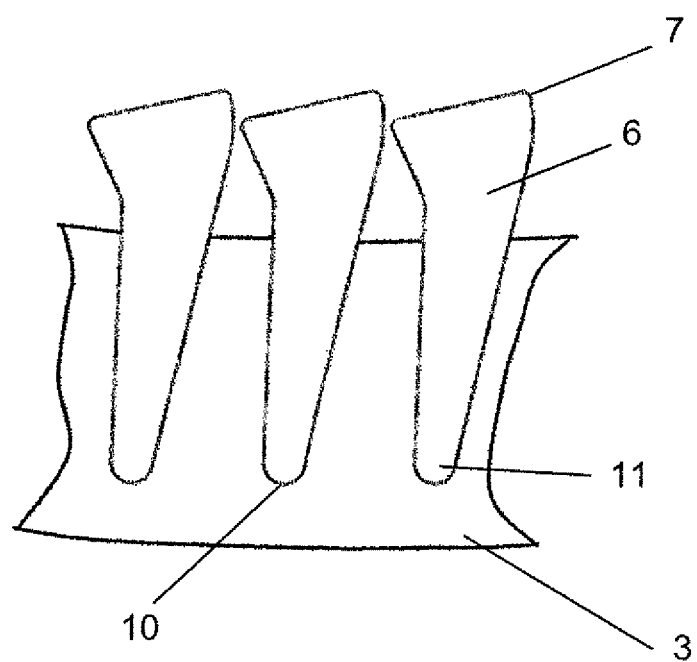
FIG. 2a shows foot sections of strainer bars inserted in corresponding receiving recesses of a support element.

FIG. 2 shows the embodiment of a head region 7 which is an important feature of the invention with, for example, two consecutive strainer bars 6. The slot flanks 8, 9 creating the straining slot or the straining gap have different radii R1, R2, which however have a common center. By this arrangement, different profile depths or profile angles β can be set regardless of the angle β relative a tangent to the imaginary strainer basket sleeve surface, whereas the slot width w always remains substantially constant.

Although not shown in the drawing, in a different embodiment, the upstream and downstream slot-forming flanks at the head region 7 of adjacent strainer bars 6 may each have has a radius with a common center.

FIG. 3 illustrates a configuration of a preferred embodiment of a strainer 1 wherein different zones or areas A, B, C, D are realized in the longitudinal axis of the strainer basket. As is evident from the schematic diagrams on the right side in FIG. 3, the profile angle $\beta_1$, $\beta_2$, $\beta_3$, $\beta_4$ change in the vertical (height) direction and preferably increase from the region A to the region D. The profile depth t also changes, and likewise increases in FIG. 3 from top to bottom commensurate with the profile angles β.

Figure 4:
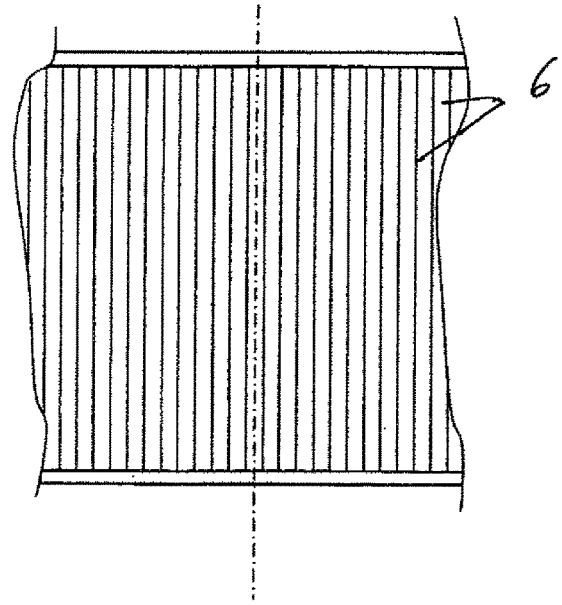
FIG. 4 a schematic view of a detail of a strainer, with the strainer bars aligned axially with respect to the strainer basket axis.
Figure 5:
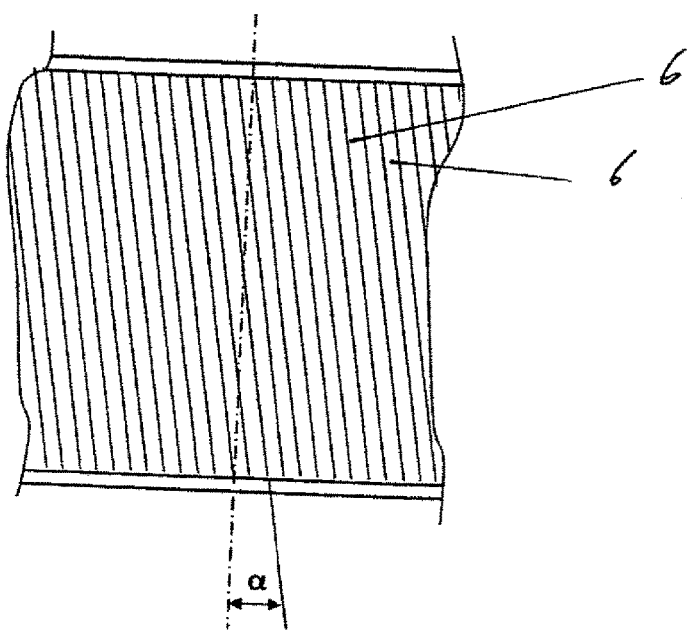
FIG. 5 another preferred embodiment of a different embodiment of a strainer, with the strainer bars inclined linearly with respect to the strainer basket axis, and FIG. 6 a schematic detailed view of a different embodiment of a strainer, with the strainer bars oriented with a discontinuous curvature with respect to the strainer basket axis.
Figure 6:
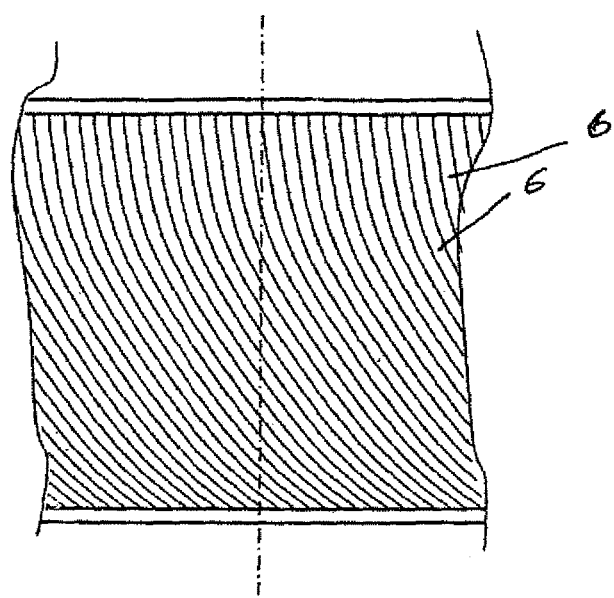

FIGS. 4 to 6 illustrate preferred orientations of the strainer bars 6 with respect to the strainer basket axis which is indicated in FIGS. 4 to 6 by broken lines.

According to the preferred embodiment of the strainer shown in FIG. 4, the strainer bars are axially aligned with the strainer basket axis. According to the preferred embodiment of the strainer shown in FIG. 5, the strainer bars 6 are linearly inclined at an angle α relative to the strainer basket axis. Finally, according to the preferred embodiment of the strainer shown in FIG. 6, the strainer bars 6 are discontinuously curved relative to the strainer basket axis.

It will be understood that the invention is not limited to the details described above, but that various changes and modifications are possible, which can be implemented by a skilled artisan. In particular, it is essential in the invention that different profile angles β and profile depths t can be defined in the vertical direction the strainer, without changing the slot width w. This makes it possible to adapt and intentionally match the strainer in the throughput direction to the respective requirements, situations and treatment conditions.

The invention claimed is:

1. A profiled strainer bar, comprising
   a base region and a head region, with the base region being received in a support member, and
   slot flanks delimiting a straining slot or straining gap with an adjacent said strainer bar and defining an upstream slot flank defined by a first radius and a downstream slot flank defined by a second radius, said first and second radii having a common center at the head region and being of different size.

2. The profiled strainer of claim 1, wherein the first radius is greater than the second radius.

3. The profiled strainer of claim 1, wherein the second radius is 0.1 mm to 1.9 mm.

4. The profiled strainer of claim 1, wherein the second radius is 0.2 mm to 0.5 mm.

5. The profiled strainer of claim 1, wherein the first radius is 2.0 mm to 6 mm.

6. The profiled strainer of claim 1, wherein the first radius is 2.1 mm to 4.0 mm.

7. The profiled strainer of claim 1, wherein the first and second radii are connected by a straight-line tangent.

8. A strainer, comprising
a plurality of profiled strainer bars forming straining slots or straining gaps between adjacent strainer bars, and
a support member having receiving recesses of a shape that matches a shape of a base region of the plurality of profiled strainer bars so as to permanently secure the strainer bars at their base region when the strainer bars are received in the receiving recesses of the support member,
each said strainer bar having a head region and slot flanks, with adjacent strainer bars forming a straining slot or straining gap, and defining an upstream slot flank defined by a first radius and a downstream slot flank defined by a second radius, said first and second radii having a common center at the head region and being of different size.

9. The strainer of claim 8, wherein the strainer is constructed as a strainer basket.

10. The strainer of claim 9,
wherein the strainer basket defines a strainer basket height from an inlet side to an outlet side of the strainer basket, said strainer bars being configured into different sections with different profile angles or profile depths along the strainer basket height.

11. The strainer of claim 9, wherein the strainer basket defines an axis, said strainer bars being oriented in axial relation to the axis of the strainer basket.

12. The strainer of claim 9, wherein the strainer basket defines an axis, said strainer bars being linearly inclined with respect to the axis of the strainer basket.

13. The strainer of claim 9, wherein the strainer basket defines an axis, said strainer bars having a discontinuously curved configuration in relation to the axis of the strainer basket.

14. The strainer of claim 9, wherein the strainer basket defines a strainer basket height from an inlet side to an outlet side of the strainer basket, said strainer bars being arranged at constant slot width between the slot flanks at different angles with respect to a tangent upon an outer surface area of the strainer basket for producing different profile depths.

15. The strainer of claim 14, wherein the angles or the profile depths increase from the inlet side to the outlet side of the strainer basket.

* * * * *